Figure 2:
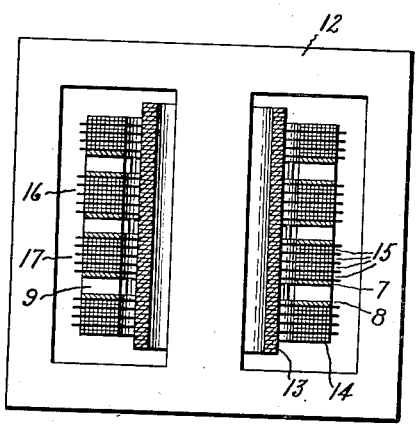

C. P. STEINMETZ.
ELECTRICAL APPARATUS.
APPLICATION FILED JAN. 14, 1915.

1,326,005.

Patented Dec. 23, 1919.

Witnesses:
George H. Tilden
J. Ellis Glenn.

Inventor:
Charles P. Steinmetz,
by his Attorney.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ELECTRICAL APPARATUS.

1,326,005. Specification of Letters Patent. Patented Dec. 23, 1919.

Application filed January 14, 1915. Serial No. 2,113.

*To all whom it may concern:*

Be it known that I, CHARLES P. STEINMETZ, a citizen of the United States, residing at Schenectady, county of Schenectady, State of New York, have invented certain new and useful Improvements in Electrical Apparatus, of which the following is a specification.

My invention relates to the distribution of the capacity of electrical apparatus throughout the same. It is applicable to various sorts of electrical apparatus, but is more particularly applicable to electrical windings, and especially to electrical windings for transformers for the higher voltages.

In windings of various types and for various purposes, it is necessary or desirable to wind the conductors in layers with spaces between some of the layers; for example, in substantially every type of large winding of considerable power such spaces are necessary for ventilation and for other reasons. Such a winding is necessarily made up of non-uniformly spaced conductors, and as constructed and connected prior to my invention has its capacity effects non-uniformly distributed throughout itself. Now I have discovered that a uniformly distributed capacity apparatus has various material advantages, and that a winding having this characteristic is particularly desirable. In a winding having uniformly distributed capacity, and likewise in other electrical apparatus having this characteristic, no local resonance and no internal reflection of electrical disturbances can generally occur, and therefore no unduly high internal voltages can be produced; the only oscillation that can take place is that of the entire apparatus, which is of minor consequence and which may generally be rendered harmless if necessary, as in the case of a winding by protective apparatus at the terminals. Therefore one object of my invention is to provide a winding for electrical apparatus having the desirable features of construction noted above but which is incapable of substantial internal local resonance and hence not subject to dangerously high internal voltages through resonance.

Further: Prior to my invention no scheme of general application has been known whereby any apparatus of considerable power and inherently of non-uniform capacity distribution, could be provided with a uniform capacity distribution or have its capacity distribution otherwise modified as might be desirable, and another object of my invention is to improve the construction and operation of electrical apparatus of various types as the construction and operation of such apparatus is affected by the distribution of the capacity thereof. This feature of my invention is of very general application and comprises electrostatically short-circuiting more or less of the spaces between conductors non-uniformly disposed or otherwise of inherently different capacity effects. This feature of my invention is available for electrostatically short circuiting the distance between substantially any two conductors, or portions or groups of conductors, and thus increasing the condensance between them to such an extent as may be necessary to bring about the desired capacity distribution. It is however particularly applicable for uniformly distributing the capacity between large groups or sections of conductors, and especially for distributing the capacity between the sections into which it is generally necessary (as before indicated) to divide numerous types of windings of considerable power like those in transformers.

Windings as I prefer and propose to construct them in order to materially reduce the internal voltages, are generally cylindrical and of a small number of turns per layer and the capacities of the layers are rendered substantially uniform by electrostatically short circuiting spaces between the sections by electrically connected metallic members. These metallic members preferably cover the two winding section faces adjacent each space. Preferably these metallic members and their connections constitute the spacers for the winding sections. The largest portion of such a winding which may resonate locally is a layer, and if each layer is kept sufficiently small, that is if it is not given too many turns, no harm or undesirable results may come from the small amount of energy therein. Practically the turns in each layer may be built up to a depth of a few inches without danger.

I have indicated above those objects and advantages of my invention which now seem to me to be most important, but other objects and advantages will be observed by a further consideration of my invention.

Figure 3:
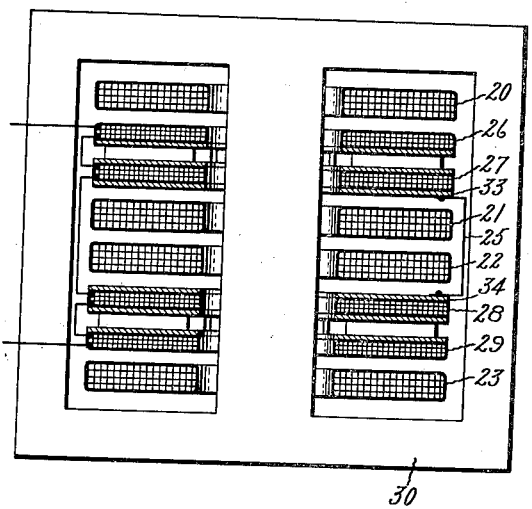
Figure 1:
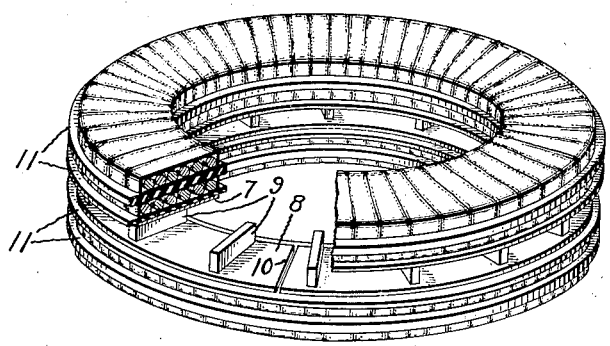

In the accompanying drawings the illustrated embodiments of my invention include a sectional winding and two general types of transformers. From the detailed description of these embodiments of my invention its general application to all electrical apparatus will be readily understood. Figure 1 is a partially sectioned perspective view of a two section electrical winding embodying my invention. Figs. 2 and 3 are elevations partly in section of a cylindrical coil transformer and a shell type disk coil transformer respectively both embodying my invention.

From Fig. 1 the general application of my invention to all electrical apparatus will be understood. In this figure I have illustrated a winding, or a portion of a winding, comprising two sections spaced apart for ventilation or other purposes; each section of the apparatus comprises two coils or layers each of which contains but a few turns. There are two features of the winding as so far described which bring about an interruption, or non-uniform distribution, of its capacity as it stands unrelated to other devices; these are the division of the winding into layers of a plurality of turns each, and the separation of the sections of the winding. The first of these may be taken care of, or neglected, by building up each layer of such a few turns that the energy therein is incapable of producing dangerous or otherwise undesirable conditions. The second feature is the more productive of dangerous conditions, for the sections, being larger portions of the apparatus contain more energy; the non-uniformity due to this feature results principally from the difference between the capacity action between the two layers adjacent the ventilating space and that between two immediately adjacent layers. These capacity actions may be equalized or adjusted as desired, by a means for electrostatically short-circuiting the space, that is, for bringing about in effect something like the same electrostatic relation between the two layers adjacent the space as exists between each two immediately adjacent layers. This means may equalize the capacities of the layers to any desired extent. The means shown here comprises two plates 7 and 8, located respectively adjacent the faces of the sections, and means 9 electrically connecting the two plates. Each of the plates 7 and 8 is substantially of the same size as the face of the section adjacent it, and each of the plates is broken as at 10 so that it may not form a short-circuited secondary turn. In this particular application, the electrical connections 9 are metallic space blocks directly in contact with, and preferably attached to, the plates 7 and 8. This electrostatic short-circuiting means therefore acts also as a spacer for the coil sections. Suitable insulation 11 is inserted between the layers, and between the sections and the spacers; the insulation in the two places being of the same material, the thickness of that between each two adjacent layers is substantially twice that between a layer and a spacer since in this case I desire to equalize the capacities of the various layers as completely as may be.

It will be apparent that the winding of this figure is, for practical purposes, one of a uniformly distributed capacity throughout its length, for each layer being made up of but a few turns can contain but insufficient energy to cause a dangerous rise in voltage at its resonance frequency, and as for the sections, the spacers uniformly distribute the capacity between them. As pointed out above, this latter feature is of quite general application wherever the effective distance between two conductors is to be changed and is particularly useful wherever conductors are grouped into fairly large sections of the apparatus, as in this instance. It may be used not only to obtain a uniform capacity distribution as here, but also to distribute the capacity in any other desired way. It will be understood that from the points of view of simplicity of construction and strength, spacers such as I have described above are particularly advantageous in a number of forms of apparatus, but for electrostatically short-circuiting spaces only, other forms of metallic members may be located adjacent the faces of the sections near the spaces, and preferably distributed over those faces, and may be otherwise electrically connected across the spaces.

In Fig. 2 a substantially uniformly distributed capacity winding is employed in a transformer. The invention is here shown applied to but the high voltage winding 14 but is not so limited. The transformer core 12 is of the three-legged type; the windings are located about the middle leg. The low voltage winding 13 is in the form of a continuous cylinder. The high voltage winding 14 is also in the form of a cylinder but is made up of a number of sections spaced apart to provide ventilating spaces; it is of the same type as the winding of Fig. 1. As here illustrated each section is made up of four double coils 15, each layer of which contains but a few turns. Between each two sections, for example, between the sections 16 and 17, is located a spacer member similar to that shown in Fig. 1 electrostatically short-circuiting the space; this form of short-circuiting means is particularly applicable to cylindrical windings.

In Fig. 3 is illustrated my invention applied to a type of transformer, now common, to improve the capacity distribution of one of its windings but not necessarily to render its capacity distribution substantially uniform throughout the entire winding. In this shell type transformer, one winding is made up of the coils or sections 20, 21, 22 and 23 of any number of turns each, and the other winding is made up of the coils or sections 26, 27, 28 and 29 of any number of turns each. These coils are in the form of disks and are intermixed in a manner now common about the middle leg of the core 30. The sections of each of the two windings are spaced apart for reasons of ventilation and insulation and to allow the insertion of sections of the other winding. Between the sections 26 and 27, and between the sections 28 and 29, are located spacers similar to those shown in Fig. 1. On the opposite face of sections 27 and 28 are located annular plates 33 and 34, similar to the plates 7 and 8; these are connected together electrically by the conductor 25. In this case the winding made up of the sections 26, 27, 28 and 29 has been given a substantially uniformly distributed capacity between the sections where lack of uniformity is most likely to be dangerous.

While I have described above the application of my invention to electrical windings only, it will be understood that my invention is applicable as well to any apparatus in which electrical conductors are non-uniformly spaced or are otherwise of inherently different capacities, and while I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States, is:—

1. A cylindrical electrical winding comprising a plurality of sections spaced from each other in the direction of the length of the winding and means for electrostatically short-circuiting the spaces thus formed.

2. A cylindrical electrical winding provided with ventilating spaces perpendicular to the axis of the winding and comprising a plurality of layers, each too small to contain sufficient energy to produce unduly high voltages through resonance, and means for electrostatically short-circuiting the ventilating spaces.

3. An electrical winding comprising a plurality of layers, each too small to contain sufficient energy to produce unduly high voltages through resonance, the layers being grouped into a plurality of spaced sections, and means for electrostatically short-circuiting the space between the sections.

4. The combination of a cylindrical electrical winding and spacers therefor providing ventilating spaces in planes perpendicular to the axis of the winding, each spacer comprising electrically connected metallic plates engaging the winding at opposite sides of its respective space and space blocks separating the plates.

5. The combination of a cylindrical electrical winding and spacers therefor providing ventilating spaces in planes perpendicular to the axis of the winding, each spacer comprising metallic plates covering the windings at opposite sides of its respective space and metallic space blocks electrically connected with and separating the plates.

6. An electrical winding comprising a plurality of sections spaced from each other and means for electrostatically short-circuiting the spaces thus formed.

7. An electrical winding comprising sections separated from each other to form spaces in planes perpendicular to the axis of the winding and means for uniformly distributing the capacity of the winding between the sections.

8. In an electrical winding, two sections thereof spaced from each other, a metallic covering for that face of each section adjacent the space thus formed, and electrically conducting means connecting said coverings.

9. In an electrical winding, two sections thereof spaced from each other, a metallic member adjacent a part of each section near the space thus formed and electrically conducting means connecting the members.

10. In an electrical winding, two sections thereof spaced from each other, metallic members distributed adjacent the parts of the sections near the space thus formed and electrically conducting means connecting the metallic members across the space.

11. An electrical winding comprising layers non-uniformly spaced from each other, and means for equalizing the capacities of the layers.

12. The combination of electrical conductors non-uniformly spaced from each other, and means for equalizing the capacities of said conductors.

13. The combination, in electrical apparatus, of electrical conductors of inherently different capacities, and means for equalizing the capacities of said conductors.

14. The combination of electrical conductors arranged in spaced sections and means for equalizing the capacities of the conductors.

15. The combination in an electrical apparatus, of spaced sections of electrical conductors and means for uniformly distributing the capacity of the apparatus between the sections.

16. The combination of electrical conductors non-uniformly spaced from each other, and means for electrostatically short-circuiting a space between two of said conductors.

17. The combination of spaced electrical conductors of inherently different capacities, and means for electrostatically short-circuiting a space between two of said conductors.

18. The combination in an electrical apparatus, of spaced sections of electrical conductors and means for electrostatically short-circuiting a space between two of said sections.

19. The combination with an electrical winding comprising a plurality of spaced groups of individually spaced coils, the spacing between said groups differing from the spacing between said coils, of means for rendering the capacitance between the immediately adjacent coils of two adjacent groups substantially equal to that between two adjacent coils of a group.

20. The combination with an electrical winding comprising a plurality of spaced groups of individually spaced coils, the spacing between said groups differing from the spacing between said coils, of means for providing a condenser having an end coil of one group as one plate thereof, means providing an additional condenser having the immediately adjacent coil of the neighboring group as one plate thereof, and means for connecting said two condensers in series relation.

21. The combination with an electrical winding comprising a plurality of spaced groups of individually spaced coils, the spacing between said groups differing from the spacing between said coils, of means for providing a condenser having an end coil of one group as one plate thereof, means providing an additional condenser having the immediately adjacent coil of the neighboring group as one plate thereof, and means for connecting said two condensers in series relation, the joint capacitance of said two condensers in series being substantially the same as that between two adjacent coils in the same group.

22. The combination with an electrical winding comprising a plurality of spaced groups of individually spaced coils, the spacing between said groups differing from the spacing between said coils, of a layer of conducting material mounted adjacent to an end coil in one group, an additional layer of conducting material mounted adjacent to the immediately adjacent end coil of the next group, and conducting means between said two conducting layers.

In witness whereof I have hereunto set my hand this 12th day of January, 1915.

CHARLES P. STEINMETZ.

Witnesses:
JOSEPH L. R. HAYDEN,
BENJAMIN B. HULL.